(12) United States Patent
Hoff

(10) Patent No.: US 10,155,411 B2
(45) Date of Patent: Dec. 18, 2018

(54) WHEEL CAP LOCK AND LOCKING METHOD

(71) Applicant: William Hoff, Bayville, NY (US)

(72) Inventor: William Hoff, Bayville, NY (US)

( * ) Notice: Subject to any disclaimer, the term of this patent is extended or adjusted under 35 U.S.C. 154(b) by 290 days.

(21) Appl. No.: 14/633,151

(22) Filed: Feb. 27, 2015

(65) Prior Publication Data

US 2015/0251488 A1    Sep. 10, 2015

Related U.S. Application Data

(60) Provisional application No. 61/967,073, filed on Mar. 10, 2014, provisional application No. 61/998,040, filed on Jun. 17, 2014.

(51) Int. Cl.
| | | |
|---|---|---|
| *B60B 7/16* | (2006.01) | |
| *B60B 7/14* | (2006.01) | |
| *B60B 7/00* | (2006.01) | |
| *F16B 41/00* | (2006.01) | |
| *B60B 7/06* | (2006.01) | |
| *B60B 7/04* | (2006.01) | |

(52) U.S. Cl.
CPC ............. *B60B 7/16* (2013.01); *B60B 7/0013* (2013.01); *B60B 7/066* (2013.01); *B60B 7/068* (2013.01); *B60B 7/14* (2013.01); *F16B 41/005* (2013.01); *B60B 7/04* (2013.01); *B60B 2900/3318* (2013.01); *Y10T 29/49826* (2015.01)

(58) Field of Classification Search
CPC ........... B60B 7/066; B60B 7/068; B60B 7/04; B60B 7/16; B60B 2900/3318; B60B 7/0013; F16B 41/005; Y10T 29/49826

USPC ........ 301/37.21, 37.29, 37.35, 37.36, 108.1, 301/108.4; 411/429, 373, 431
See application file for complete search history.

(56) References Cited

U.S. PATENT DOCUMENTS

| | | | | |
|---|---|---|---|---|
| 4,171,851 A | * | 10/1979 | Scruggs | B60B 7/16 301/37.21 |
| 5,222,785 A | * | 6/1993 | Green | B60B 7/068 301/108.4 |
| 6,053,681 A | * | 4/2000 | Mattershead | F16B 37/14 411/14 |
| 7,252,470 B1 | * | 8/2007 | Sanchez | B25B 13/485 301/35.621 |
| 8,016,535 B1 | * | 9/2011 | Roberts | F16B 41/005 411/373 |
| 8,777,327 B1 | * | 7/2014 | Faux | B60B 7/16 301/37.21 |
| 2007/0199651 A1 | * | 8/2007 | Woelfel | B29C 44/1233 156/290 |

FOREIGN PATENT DOCUMENTS

| | | | | |
|---|---|---|---|---|
| EP | 0040667 A1 | * | 12/1981 | ............ F16B 41/005 |
| GB | 2153948 A | * | 8/1985 | ............ F16B 41/005 |

* cited by examiner

*Primary Examiner* — S. Joseph Morano
*Assistant Examiner* — Jean W Charleston
(74) *Attorney, Agent, or Firm* — Lawrence I. Wechsler; Wechsler & Wechsler, P.C.

(57) ABSTRACT

A wheel cap lock includes an engagement receiver fastened to a selected one of wheel lugs of a vehicle for securably engaging an engagement fastener received from an outside of the wheel cap through a hole formed therein in correspondence with a location of the engagement receiver when installed to the selected lug.

20 Claims, 5 Drawing Sheets

WHEEL CAP LOCK AND LOCKING METHOD

BACKGROUND OF THE INVENTION

The present invention relates to a wheel cap lock for maintaining a wheel cap and the like to a wheel, for example that of a motor vehicle, and more particularly to a wheel cap lock that can be provided by an original equipment manufacturer, or optionally provided as a part or kit which can be installed aftermarket to help prevent accidental loss or theft of a wheel cap.

A wheel cap (sometimes referred to in the alternative as a wheel cover), provided for example, in the form of a well known hubcap comprising a removable plastic or metal cover received on the center of a car or truck wheel, and generally covering an entirely of a wheel rim, have been conventionally available for decades. They serve to protect the wheel lugs holding the vehicle wheel to the wheel hub from exposure to elements on the road which may cause corrosion, and to provide a decorative appearance to a wheel. Vehicle manufactures sometimes use wheel covers or to improve the appearance of painted steel rims, while concomitantly avoiding the added cost of using more expensive alloy type wheels.

While wheel covers and hubcaps generally cover the entire wheel rim, wheel center caps are also known, which can also be used on more expensive alloy wheels. These typically will cover only the center of the wheel, serving to cover the wheel lug nuts.

While bolt-on wheel covers are known, and which have holes coinciding positionally with the lugs carried on the wheel hub, the lug nuts used to secure the wheel cover to the wheel rim remain exposed, and can detract from the appearance of the wheels.

Heretofore, hubcaps (wheel covers) and wheel center caps (generically referred to herein as "wheel caps") which completely obscure the wheel lug nuts, and which exclusively rely on a press fit or interference engagement fit with the rim part for securement, have been prone to detachment from the wheel either through accidental loss, as when dislodged as the result of striking a deep pothole, or by theft, and the prior art has failed to adequately address this significant drawback.

It would therefore be desirable to provide a wheel cap lock and a wheel cap locking method which would provide a vehicle owner with the piece of mind that wheel caps would remain on the wheels until intentionally removed.

SUMMARY OF THE INVENTION

It is an object of the invention to provide a wheel cap lock and wheel cap locking method which overcomes the drawbacks of the prior art.

It is a further object of the invention to provide a wheel cap lock which can be produced economically, and a wheel cap locking method that can be carried out reliably and in a simple, easy to apply manner.

In accordance with these and other objects of the invention, in broadly stated terms, an engagement receiver is fastened to a selected one of the wheel lugs for securably engaging an engagement fastener received from an outside of the wheel cap through a hole formed therein. In this regard, installation of the wheel cap lock according to the invention requires, in addition to the structural components, the formation of a hole in the wheel cap in correspondence with the location of the engagement receiver when installed to the selected lug, created by drilling, punching or other suitable procedure.

In one embodiment, applicable where sufficient clearance is present between a terminal end of the selected wheel lug and an inside of the wheel cap when installed to the wheel rim (depending on a particular vehicle manufacturer's design specifications), the wheel cap lock advantageously comprises a replacement wheel lug nut of modified design which replaces a standard lug nut, and which is securable to the wheel lug of the lug nut being replaced. The modified wheel lug nut has a greater axial length than the original, such that a portion thereof extends beyond the terminal end of the lug to which is it is threadably received. Whereas, the lug of the wheel entirely occupies the full extent of the threads of the original lug nut, the replacement lug nut presents an outwardly facing segment provided on the portion thereof extending beyond the end of the lug which operates as the aforementioned engagement receiver, which is of sufficient length to allow the engagement fastener to securably engage the ancillary segment of the replacement lug nut functioning as the engagement receiver.

Another embodiment, which is alternatively applicable even in cases where sufficient clearance is present as allowing practice of the previous embodiment, find particular application as a replacement for the above embodiment where insufficient clearance exists between the terminal end of the lug and inside surface of the wheel cap opposite to the terminal end to accommodate a greater length replacement lug nut. In such instance, the wheel cap lock includes an engagement receiver which is securably fastened by a selected one of the original lug nuts threaded to a corresponding selected wheel lug, and which includes an engagement portion adjacent to the selected wheel lug. In accordance with the embodiment, a receiving bracket is provided which includes a hole for clearing the lug therethrough and an adjacent engagement portion carried fixedly on the bracket, conveniently, for example, as part welded thereto or integral therewith. In practice, a selected one of the wheel lugs is received through the hole in the bracket and the lug nut is tightened to secure the bracket, with the engagement portion facing outward. The cap is placed in its wheel-mounted orientation to the wheel rim, and an engagement fastener is received from an outside of the wheel cap through a hole formed therein corresponding positionally with the engagement portion, for secured engagement.

The engagement receiver and the engagement fastener can include any suitable mutually cooperative engagement structure, for example, bayonet mounting structure, slot/flange engagement, screw threads, etc. The exemplary preferred embodiments, for illustration purposes only, utilize threads for providing a convenient engagement structure.

Also, while the illustrated examples described herein depict embodiments directed specifically to wheel center caps, for example those present on current CADILLAC ESCALADE models (eg., 2007-2014), it will be understood that the principles set forth herein with find analogous application in locking a hub cap or wheel cover which overlays the lug nuts, and which is not already fastened thereto by the wheel lug nuts.

The above, and other objects, features and advantages of the present invention will become apparent from the following description read in conjunction with the accompanying drawings.

DETAILED DESCRIPTION OF THE PREFERRED EMBODIMENT

Before describing the invention in detail, with reference to two practical examples relating specifically to wheels used on automobiles currently available on the market, for illustration purposes, it will be understood that the general principles disclosed herein and applied concretely in connection with the examples depicted in the figures can be used to lock other wheel caps to other vehicle wheels simply by alteration of the various positioning and dimensioning of the various elements of the wheel cap lock according to embodiment of the invention.

Figures 1, 2:
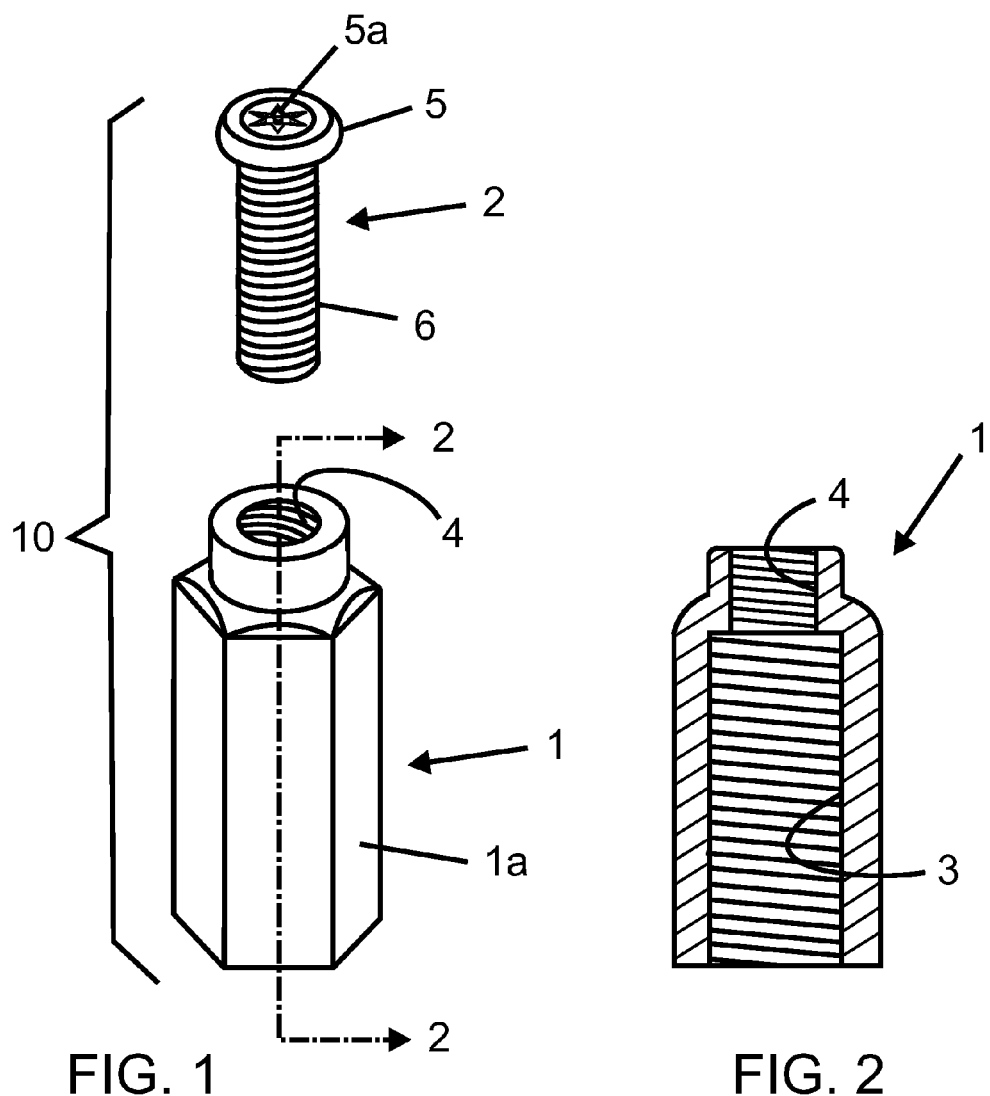
FIG. 1 is perspective exploded side view of an embodiment of a wheel cap lock according to the invention.
FIG. 2 is a cross-sectional view taken along line 2-2 in FIG. 1.

Referring now to the figures, and in particular FIG. 1, an embodiment of a wheel cap lock is shown at 10. Wheel cap lock 10 comprises an engagement receiver provided in the present embodiment conveniently in the form of a replacement lug nut 1 and an engagement fastener 2 for engaging replacement lug nut 1. Replacement lug nut 1 includes a body portion 1a, conveniently for example, having a familiar hexagonal cross-section for engagement by a wrench, and a first threaded portion 3 running a sufficient distance from a base thereof to allow threadable engagement with a selected wheel lug, such that replacement lug nut 1 thereby serves as a replacement for the original lug nut which has been removed from the selected wheel lug. Replacement lug nut 1 further includes a second threaded portion 4 running to a top thereof. Engagement fastener 2 includes a head 5 and a threaded portion 6 configured to threadably engage the second threaded portion 4 of replacement lug nut 1.

Figure 3:
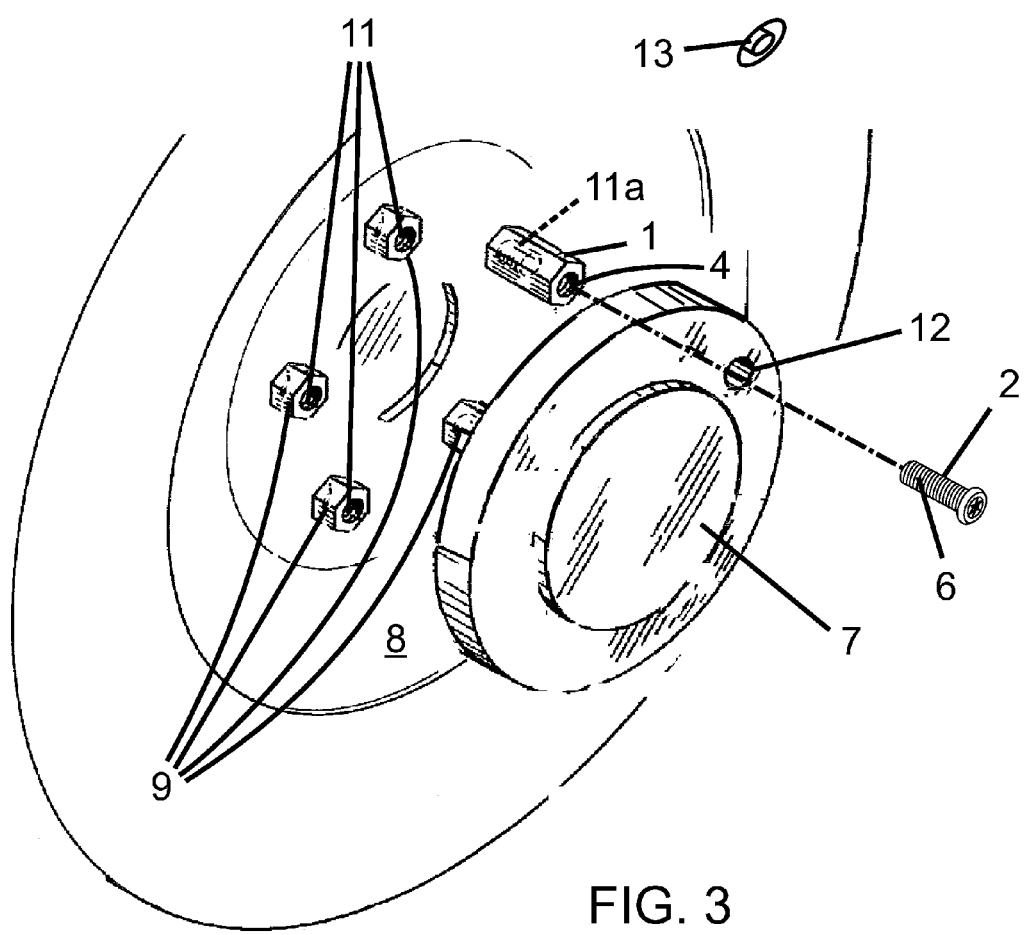
FIG. 3 is a explanatory perspective exploded view of the embodiment of FIGS. 1 and 2 depicting installation thereof to a wheel rim.

The manner of assembly to lock a wheel cap to a wheel rim employing the embodiment of FIGS. 1 and 2 is depicted in FIG. 3, using a specific example of a center cap for a 2007-2014 CADILLAC ESCALADE having 22" wheels and 7 spokes (depiction of the spokes being omitted for simplicity).

A center cap 7 is normally receivable to a wheel rim 8 by an interference or press fit between a circumferential portion of center cap 7 and an indented portion of wheel rim 8, and serves to cover the original lug nuts 9. Since sufficient clearance between lugs 11 and an inside facing wall of center cap 7 is present in this model wheel, adequate to accommodate the increased length of replacement lug nut 1, when center cap 7 is installed to the wheel rim 8, the replacement lug nut 1 does not interfere with proper seating of center cap 7 on wheel rim 8.

As shown in FIG. 3, the replacement lug nut 1 is tightened onto a selected lug 11a from which the original lug nut (not shown) has been removed. Optionally and advantageously, the selected lug nut 11a will be the one closest to a valve stem 13 of the wheel. The advantage of this placement is that if the wheel requires balancing by placement of a weight opposite to the valve stem 13, only a single weight a little heavier need by added to also compensate for the larger replacement lug nut 1, rather than requiring two balancing weights in different positions.

A hole 12 sized to permit clearance of engagement fastener 2 therethrough, but smaller than head 5, is formed in center cap 7 prior to installation. Hole 12 is positioned to coincide with the corresponding position of replacement lug nut 1 when center cap 7 is seated on wheel rim 8. Threaded portion 6 of engagement fastener 2 is then screwed into the second threaded portion 4 of replacement lug nut 2 through hole 12 in center cap 7, and tightened, care being taken not to crack the plastic center cap 7 by over tightening. Center cap 7 is now effectively fastened to wheel rim 8.

Optionally, engagement fastener 2 is provided with a tamper resistant head feature, for example having a center pin TORX (star-shaped) configuration, as identified by reference designator 5a (see FIG. 1). As such, in addition to preventing accidental loss or theft of the center cap or other type wheel cap, wheel cap lock 10 will concomitantly serve to deter theft of the wheel itself by discouraging access to the lug nuts 11, 11a protected under the locked center cap 7.

As noted above, while the illustrated example provides the engagement structure in the form of an internal second threaded portion 4 and the engagement fastener in the form of a bolt having outer threaded portion 6, other forms of mutual engagement are contemplated without departure from the invention. For example, replacement lug nut 1 could be provided with external threads engageable with internal threads provided in an alternatively designed engagement fastener. It is further contemplated that another form of engagement which does not employ threads could be used, such as a bayonet mounting approach, slot-in-groove engagement, etc.

Figure 4A:
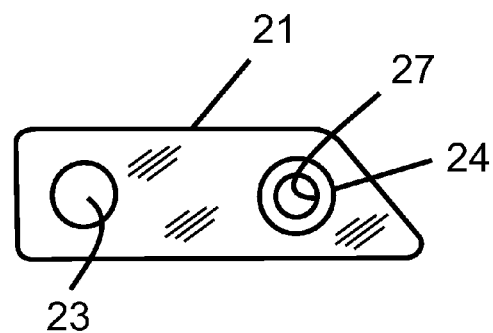
FIG. 4a is a top plan view of a receiving bracket provided as part of another embodiment of a wheel cap lock according to the invention.
Figure 4B:
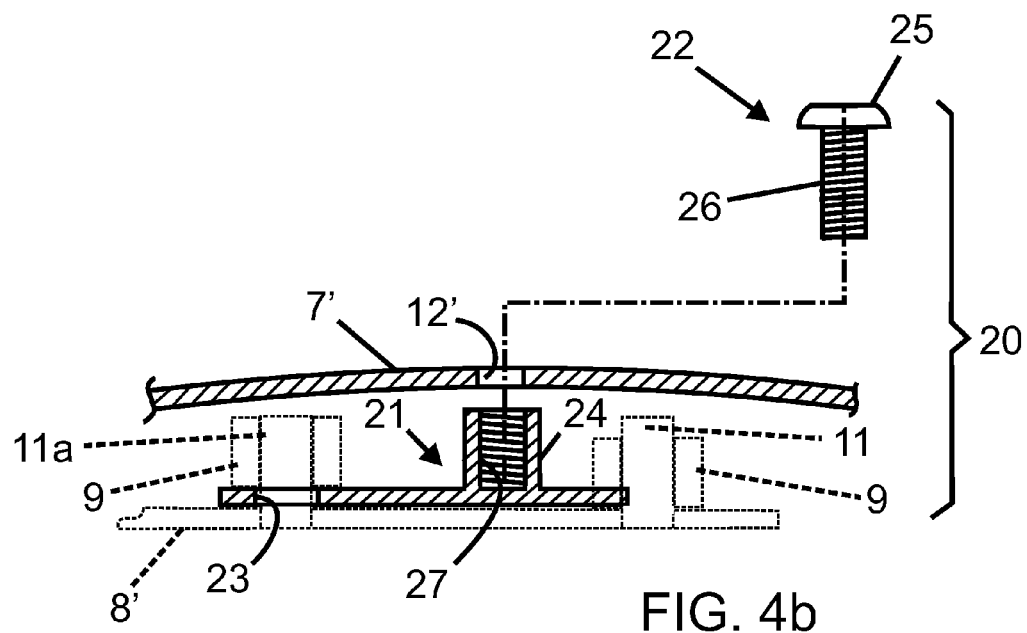
FIG. 4b is a cross-sectional view taken along line 4b-4b, shown in relation to an engagement fastener.
Figure 5:
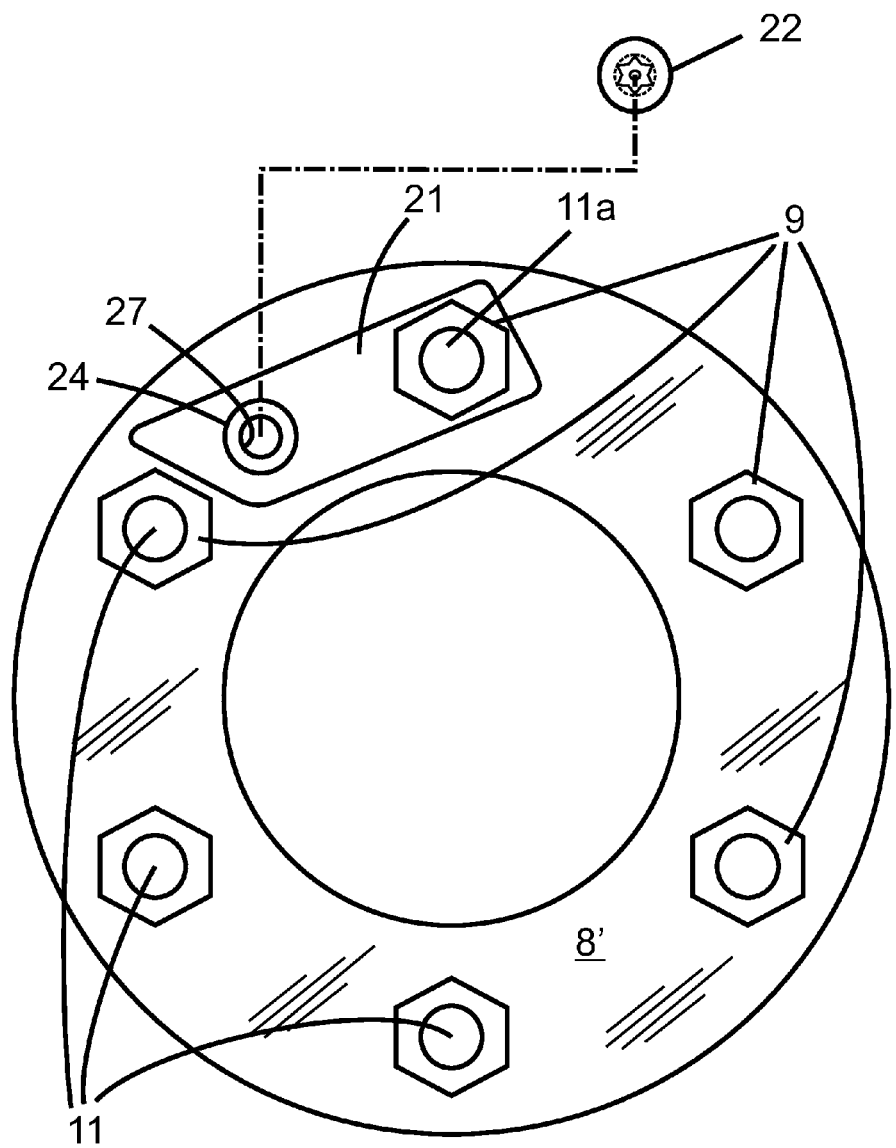
FIG. 5 is an explanatory side elevational view showing the receiving bracket of the wheel cap lock embodiment of FIGS. 4a and 4b assembled to a partially depicted wheel rim.

Turning now to FIGS. 4a, 4b and 5, another embodiment of a wheel cap lock is depicted, generally at 20. Wheel cap lock 20, while universally applicable and relevant even in cases where sufficient clearance is present as allowing practice of the previous embodiment, finds particular application as a substitute for the above embodiment where insufficient clearance exists between the terminal end of the lug 11 and inside surface of the wheel cap opposite to the terminal end of the lug to accommodate a greater length replacement lug nut.

Wheel cap lock 20 according to this embodiment includes an engagement receiver in the form of a receiving bracket 21, and an engagement fastener 22 for engaging the engagement receiver. Receiving bracket 21 includes a hole 23 for allowing passage of the selected lug 11a therethrough, and an adjacent engagement portion 24 carried fixedly on the receiving bracket 21 as an ancillary structure conveniently including internal threads 27 serving as engagement structure cooperative with corresponding threads 26 carried on engagement fastener 22, the engagement portion 24 conveniently, for example, being provided as a part welded thereto or formed integrally with receiving bracket 21.

In practice, a selected one of the wheel lugs 11a is received through the hole 23 in the bracket 21, and the original lug nut 9 corresponding to the lug 11a of the selected anchoring pair is tightened to secure the receiving bracket 21, with the engagement portion 24 facing outward, as shown in FIGS. 4b and 5. The cap is then placed in its wheel-mounted orientation to the wheel rim, and engagement fastener 22 is received from an outside of the wheel cap 7' through a hole 12' formed in the wheel cap 7'.

Receiving bracket 21 may be comprised of suitable material, for example steel or the like.

As with the previously described embodiment, while the illustrated example provides the engagement portion 24 having internal threads 27 and the engagement fastener 22 in the form of a bolt or screw having outer threaded portion 26, other forms of mutual engagement (some examples already mentioned above) are contemplated without departure from the invention.

Figure 6:
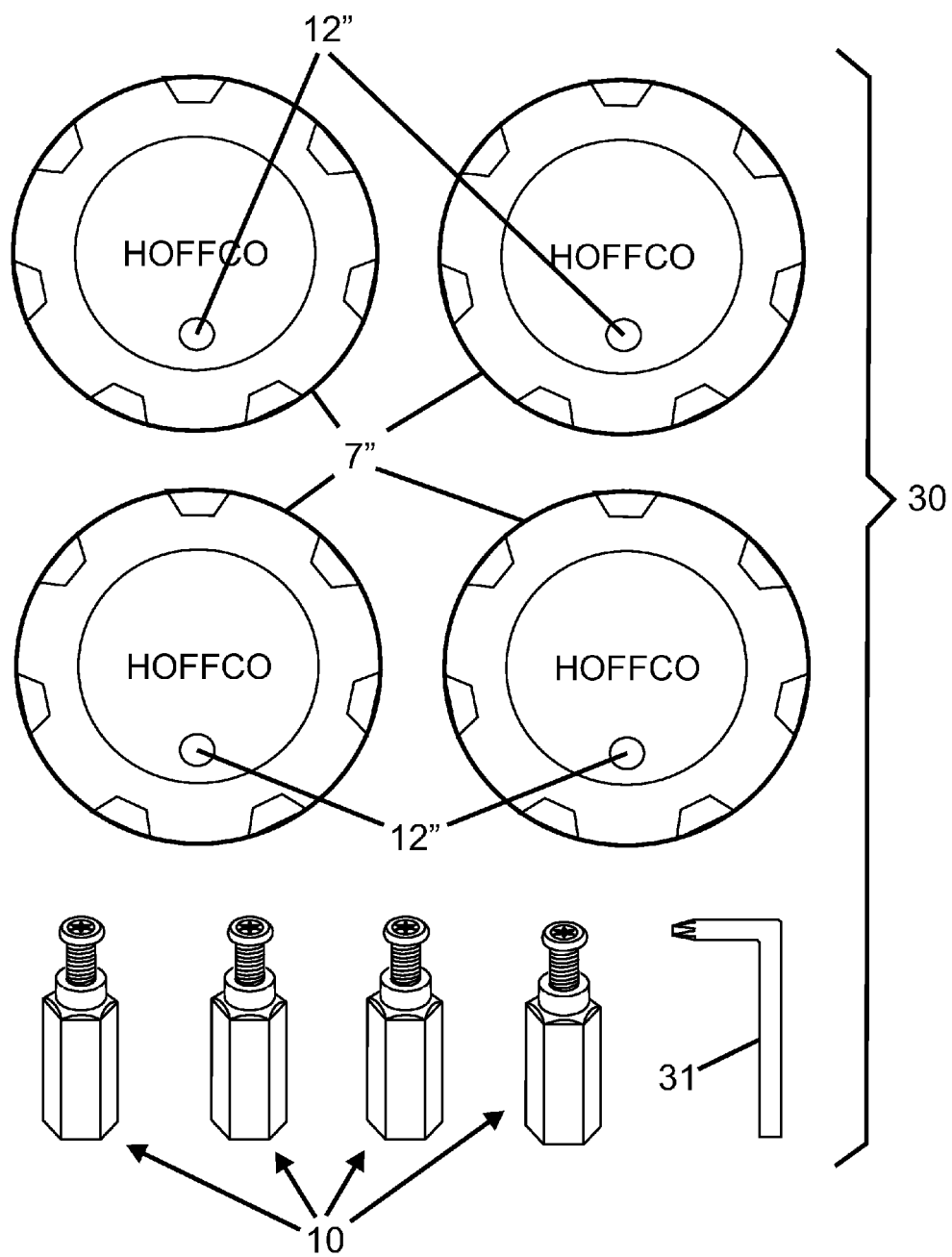
FIG. 6 is a diagram depicting a kit comprising a set of wheel caps and wheel cap locks.

Since the present invention will find application in connection with many leased vehicles, it is likely that the lessee will be reluctant to drill a hole in each of the wheel caps necessary for practice of the locking method. As such, a kit, depicted in FIG. 6 may be provided, generally designated 30.

Kit 30 includes after market wheel caps 7" (four shown, for example, to fit a four wheel vehicle) with preformed holes 12" and a set of wheel cap locks 10, advantageously of matching number. Also, particularly when a TORX screw head of other security type configuration is provided, an allen wrench 31 of matching configuration may be optionally provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A wheel cap lock for securing a wheel cap to a wheel rim of a vehicle, in which wheel lugs extend through apertures in the wheel rim, the wheel cap including an inside facing wall which is spaced apart by a fixed distance from the wheel rim at positions directly adjacent to the apertures when the wheel cap is mounted to the wheel rim, the wheel cap lock comprising:
an engagement receiver being fastenable to a selected one of the wheel lugs of the vehicle, said engagement receiver including an engagement portion which extends outwardly of the wheel rim a maximum distance which is less than said fixed distance such that a gap is present between the inside facing wall and an end of the engagement portion which is nearest the inside facing wall when the engagement receiver is fastened to the selected one of the wheel lugs; and
an engagement fastener receivable from an outside of the wheel cap through a hole formed therein in correspondence with a location of said engagement portion of the engagement receiver when said engagement receiver is installed to the selected one of the wheel lugs, said engagement fastener being engageable with said engagement portion, a portion of said engagement fastener engaging the wheel cap in a manner blocking detachment of the wheel cap from the wheel rim.

2. A wheel cap lock according to claim 1, wherein:
said engagement receiver includes a replacement lug nut comprising a body portion having a base and a top;
said body portion includes a first threaded portion adjacent said base which is threadably engageable with said selected wheel lug; and
said body portion further includes a second threaded portion adjacent said top of said body portion comprising said engagement portion.

3. A wheel cap lock according to claim 2, wherein said second threaded portion includes a smaller thread than said first threaded portion.

4. A wheel cap lock according to claim 1, wherein said engagement fastener includes a threaded portion and a head having a diameter larger than that of said threaded portion.

5. A wheel cap lock according to claim 4, wherein said head of said engagement fastener includes a tamper resistant engagement feature for removal and installation.

6. A wheel cap lock according to claim 1, wherein:
said engagement receiver comprises a receiving bracket including a hole for allowing passage of a selected lug therethrough; and
said receiving bracket further includes said engagement portion carried fixedly on the receiving bracket adjacent to said hole.

7. A wheel cap according to claim 6, wherein said engagement portion is spaced apart from said hole along said receiving bracket.

8. A wheel cap according to claim 6, wherein said engagement portion includes internal threading for engaging corresponding male threads carried on said engagement fastener.

9. A wheel cap according to claim 6, wherein said engagement portion is at least one of integral with said receiving bracket or welded thereto.

10. A method of affixing a wheel cap to a vehicle wheel rim, comprising:
fastening an engagement receiver to a selected one of lugs of the vehicle wheel rim, said engagement receiver including an engagement portion;
forming a single hole in the wheel cap in correspondence with a position of said engagement portion when said engagement receiver is installed to the vehicle wheel rim, a remainder of said wheel cap being free of additional holes positionally corresponding to remaining ones of said lugs; and
fastenably engaging an engagement fastener with said engagement portion of said engagement receiver from an exterior of said wheel cap through said single hole, said engagement fastener including a portion engaging said wheel cap in a manner blocking detachment of said wheel cap from the vehicle wheel rim.

11. A method according to claim 10, wherein said selected one of said lugs is a one closest to a valve stem of said vehicle wheel.

12. A method according to claim 10, wherein said fastening and said fastenably engaging include threadable engagement.

13. A method according to claim 10, wherein said wheel cap is a center cap.

14. A wheel cap kit for securing wheel caps to wheel rims of a vehicle, in which wheel lugs extend through apertures in each of the wheel rims, the wheel cap kit comprising:
replacement wheel caps configured for replacing existing wheel caps on a vehicle, the replacement wheel caps each including an inside facing wall which is spaced apart by a fixed distance from each of the wheel rims at positions directly adjacent to the apertures when each of the replacement wheel caps is mounted to a corresponding one of the wheel rims;
engagement receivers each being fastenable to a selected one of wheel lugs of a vehicle, each of said engagement receivers including an engagement portion which extends outwardly of each of the wheel rims a maximum distance which is less than said fixed distance such that a gap is present between the inside facing wall and an end of the engagement portion which is nearest the inside facing wall when the engagement receiver is fastened to the selected one of the wheel lugs;

said replacement wheel caps each including a hole positioned in correspondence with a location of said engagement portion of each of said engagement receivers when installed to the selected one of the wheel lugs; and engagement fasteners, each being receivable from an outside of a given one of said replacement wheel caps through said hole formed therein in correspondence with a location of said engagement portion of the engagement receiver when each of said engagement receivers is installed to the selected one of the wheel lugs, said engagement fasteners each being engageable with said engagement portion, a portion of each of said engagement fasteners engaging each of the replacement wheel caps in a manner blocking detachment of the replacement wheel caps from the wheel rims.

15. A wheel cap kit according to claim 14, wherein:
said engagement receivers each includes a replacement lug nut comprising a body portion;
said body portion having a base and a top;
said body portion includes a first threaded portion adjacent said base which is threadably engageable with said selected wheel lug; and
said body portion further includes a second threaded portion adjacent said top of said body portion.

16. A wheel cap kit according to claim 15, wherein said second threaded portion includes a smaller thread than said first threaded portion.

17. A wheel cap kit according to claim 14, wherein said engagement fasteners each includes a threaded portion and a head having a diameter larger than that of said threaded portion.

18. A wheel cap kit according to claim 17, wherein said head of each of said engagement fasteners includes a tamper resistant engagement feature for removal and installation.

19. A wheel cap kit according to claim 14, wherein:
each of said engagement receivers comprises a receiving bracket including a hole for allowing passage of a selected lug therethrough; and
each of said receiving brackets further includes said engagement portion carried fixedly on the receiving bracket adjacent to said hole.

20. A wheel cap kit according to claim 14, further comprising an allen wrench.

* * * * *